June 12, 1951  C. I. WALKER  2,556,950
PLASTIC VISOR
Filed Jan. 17, 1949
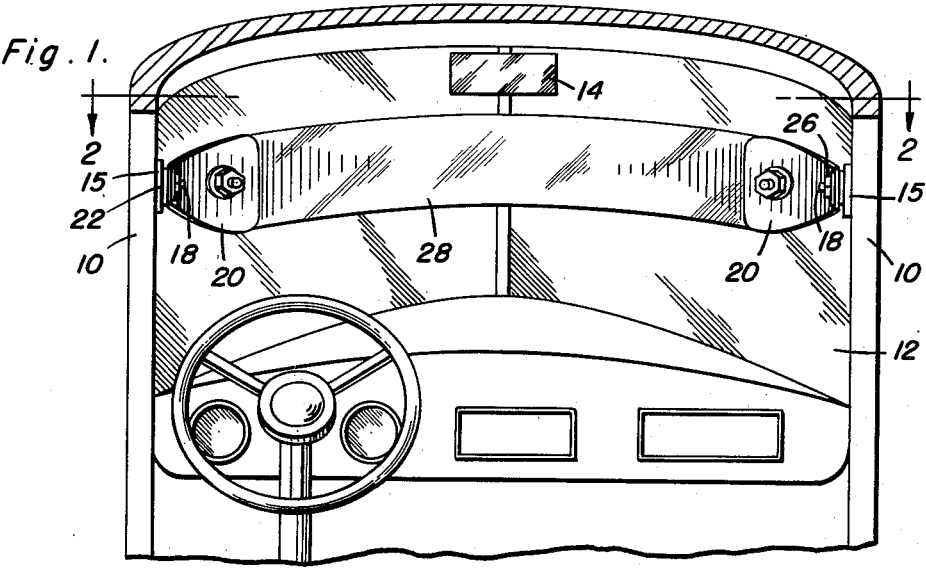
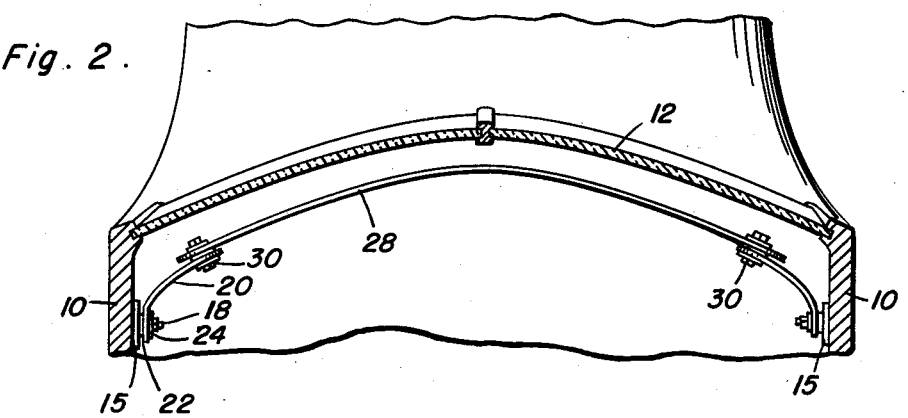
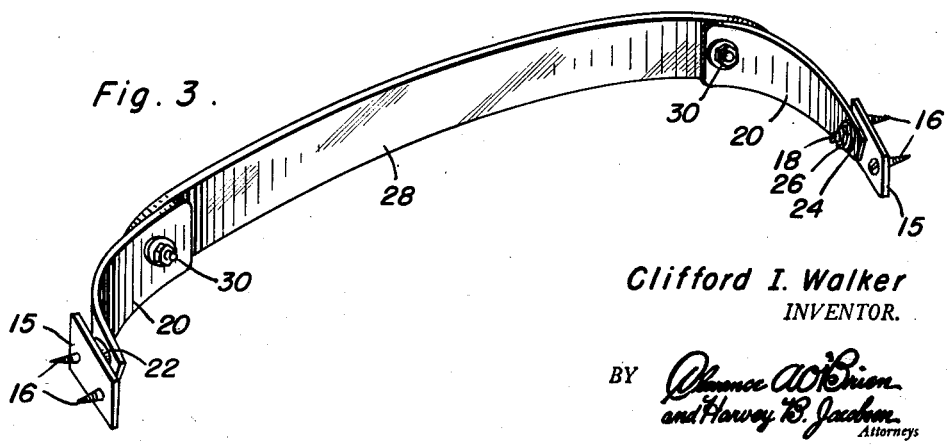
Clifford I. Walker
INVENTOR.

Patented June 12, 1951

2,556,950

UNITED STATES PATENT OFFICE 2,556,950

PLASTIC VISOR

Clifford I. Walker, Great Falls, Mont.

Application January 17, 1949, Serial No. 71,335

1 Claim. (Cl. 296—97)

This invention relates generally to automotive vehicles and more particularly to a glare shield assembly for the protection of the eyes of the driver and other occupants of an automotive vehicle.

A primary object of this invention is to provide for effective protection against the glare from the oncoming headlights of other vehicles and from light reflected by the rear view mirror when the vehicle is operated at night, as well as protecting against the glare of the sun when the vehicle is being operated in daytime under certain conditions.

Another object of this invention is to provide a glare shield which is mounted within easy reach of the driver of the vehicle, and which is very easy to adjust, and it should also be noted that the entire width of the windshield is covered by this device without undue loss of vision.

Still another object of this invention is to provide a device of this character which is adapted to be used, without alteration, on vehicles of slightly different dimensions.

And a last object to be mentioned specifically is to provide a glare shield assembly which is relatively inexpensive and practicable to manufacture, which is safe, simple and convenient to install and to use, and which will give generally efficient and durable service.

With these objects definitely in view, this invention resides in certain novel features of construction, combination and arrangement of elements and portions as will be hereinafter described in detail in the specification, particularly pointed out in the appended claim, and illustrated in the accompanying drawings which form a material part of this application, and in which:

Figure 1 is a view of a portion of an automotive vehicle, part of which is shown in vertical section, with this invention operatively mounted therein;

Figure 2 is a horizontal sectional view, taken substantially upon the line 2—2 of Figure 1; and Figure 3 is a three dimensional view of the glare shield assembly separated from the vehicle.

Similar characters of reference designate similar or identical elements and portions throughout the specification and throughout the different views in the drawing.

Referring now to the drawings in detail, this invention is adapted to be used with an environment including corner post structure 10 in an automotive vehicle, a windshield 12 and a rear view mirror 14.

A pair of similar blocks 15 are rigidly secured to the corner post structure 10 at each side of the windshield 12, self-tapping screws 16 being used to attach the blocks in place. A bolt 18 is carried by each of the blocks 15 and extends inwardly of the vehicle for the pivotal mounting thereof of the arms 20 which comprise short straps of colored transparent plastic or the like, the bolts 18 being arranged colinearly so that the arms 20 may rotate about a common axis on each side of the vehicle. A complement of resilient spacers 22 and 24 will be placed between the blocks and the corresponding arms and between the arms and nuts 26 on bolts 18, so that the arms may be held frictionally against rotation on the bolts 18, while allowing a certain degree of misalignment of the bolts due to the difficulty in securement of the blocks 15 in exactly similar positions on the opposite sides of the vehicle. In other words, the use of the washers 22 and 24 facilitates the mounting of the blocks.

An elongated panel of transparent sheet material 28, preferably colored and of a character to absorb certain of the light from the headlights of an oncoming car or the sun, extends across the windshield 12 and is terminally secured, as by the bolts 30 to the ends of the arms 20 remote from the blocks 15. In this connection, it will be noted that the arms 20 are preferably curved inwardly and forwardly with respect to the vehicle and that the panel 28 will as a result be supported in forwardly arched form as indicated in the drawing. If preferred, washers of resilient material may be employed with the bolts 30.

The operation of this invention will be clearly understood from a consideration of the foregoing description of the mechanical details thereof, taken in connection with the objects and it will be obvious that all the objects are amply attained by this invention. The driver may shift the panel 28, along with the arms 20, upwardly away from the windshield 12, when the device is not to be used. When the driver desires to protect his eyes against light reflected from the rear view mirror 14, it is only necessary for him to move the panel slightly upwardly from the position indicated in Figure 1, and it will be obvious that the panel 28 may be moved into the required position to protect the eyes of the driver and the other occupants of the vehicle from light of the headlights of an approaching vehicle. Finally, the panel may also be placed in a position to protect the eyes of the occupants of the vehicle from the glare of the sun. In each case, the arms 20 will be prevented from shifting after adjustment has been made by the frictional contact of the arms 20 with the bolts 18 and washers 22 and 24.

Obviously the proportioning of the various elements of this invention and the exact character of the different elements may be changed somewhat from the embodiment illustrated and without departure from the spirit of this invention and the scope of the invention should be determined by the terms used in the subjoined claim.

Having described the invention, what is claimed as new is:

A glare shield assembly to protect the eyes of occupants of an automotive vehicle having a windshield and a rear view mirror, comprising an elongated panel of transparent sheet material extending across said windshield and terminally pivoted on each side of the vehicle so as to be adjustable about a horizontal axis to cover different portions of the windshield and to cover said mirror when in one position, mounting blocks secured on each side of the vehicle, inwardly extending bolts secured to said blocks, arms pivoted on said bolts and secured to the ends of the elongated panel, and resilient spacers between the blocks and the arms to facilitate the operative mounting of the blocks on the somewhat irregular interior portions of vehicles.

CLIFFORD I. WALKER.

REFERENCES CITED

The following references are of record in the file of this patent:

UNITED STATES PATENTS

| Number | Name | Date |
|---|---|---|
| 2,238,981 | Newell | Apr. 22, 1941 |
| 2,252,715 | Levy | Aug. 19, 1941 |

FOREIGN PATENTS

| Number | Country | Date |
|---|---|---|
| 409,173 | Great Britain | Apr. 26, 1934 |
| 445,793 | Great Britain | Apr. 20, 1936 |